United States Patent

[11] 3,589,459

| [72] | Inventor | Arthur Frank Harvey<br>Basingstoke, Hampshire, England |
|---|---|---|
| [21] | Appl. No. | 826,225 |
| [22] | Filed | May 20, 1969 |
| [45] | Patented | June 29, 1971 |
| [73] | Assignee | Lansing Bagwall Limited<br>Basingstoke, Hampshire, England |
| [32] | Priority | May 20, 1968 |
| [33] | | Great Britain |
| [31] | | 23943/68 |

[54] INDUSTRIAL PALLET TRUCK WITH HYDRAULIC WEIGHING MEANS
7 Claims, 5 Drawing Figs.

[52] U.S. Cl. .................................................. 177/141, 177/208
[51] Int. Cl. .................................................. G01g 19/10
[50] Field of Search .................................... 177/136, 140, 141, 208, 254

[56] References Cited
UNITED STATES PATENTS

| 3,035,650 | 5/1962 | Friedl ........................... | 177/141 X |
| 3,036,664 | 5/1962 | Smith et al. .................. | 177/136 X |
| 3,154,160 | 10/1964 | Rockwell ...................... | 177/141 |
| 3,431,992 | 3/1969 | Whitecar ...................... | 177/140 |

Primary Examiner—Richard B. Wilkinson
Assistant Examiner—George H. Miller, Jr.
Attorney—E. T. LeGates ABSTRACT: In an industrial pallet or stillage truck of the kind comprising a body portion having a drive unit and being supported on a number of ground wheels, a load support projecting from the body portion of the truck, and an hydraulic system for raising and lowering the load support through a short distance relatively to the body portion so as to pick up a pallet or stillage beneath which the support is introduced, there is provided an hydraulic pressure sensing device calibrated in units of weight so as to give a direct reading of the weight of the load being carried by the load support, the hydraulic system also includes valve means operable momentarily to place the system into communication with exhaust so as to relieve inherent stresses in the system and obtain a true weight reading.

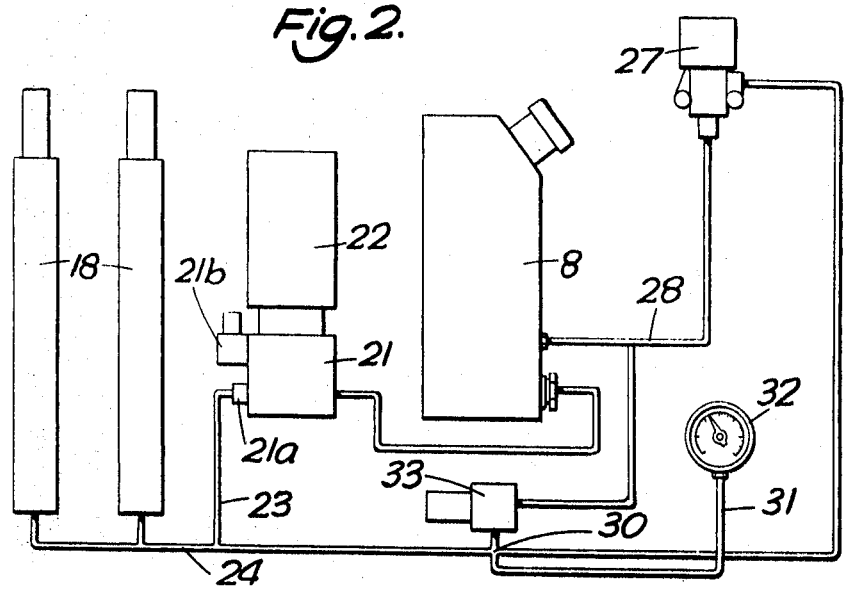
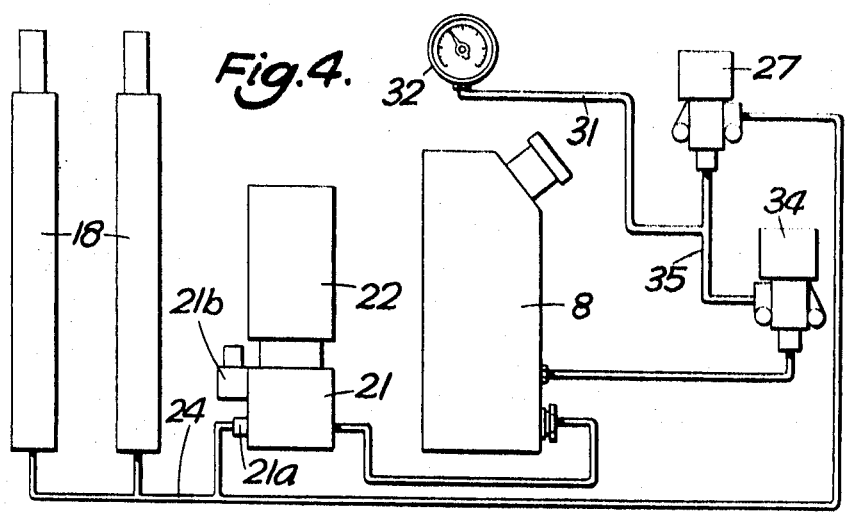

INDUSTRIAL PALLET TRUCK WITH HYDRAULIC WEIGHING MEANS

The invention relates to industrial pallet or stillage trucks of the kind comprising a body portion having a drive unit and being supported on a number of ground wheels, a load support projecting from the body portion of the truck, and an hydraulic system for raising and lowering the load support through a short distance relatively to the body portion so as to pick up a pallet or stillage beneath which the support is introduced.

According to the invention a truck of the kind referred to is characterized in that there is provided in the hydraulic system an hydraulic pressure sensing device calibrated in units of weight so as to give a direct reading of the weight of the load being carried by the load support, and valve means operable momentarily to place the hydraulic system into communication with exhaust.

By momentary operation of the valve means when the load support is in its raised position, the inherent stresses in the system are relieved so that the sensing device gives a true reading of the weight of the load.

Preferably said valve means are arranged, when operated, automatically to place the hydraulic system momentarily into communication with exhaust. The valve means may comprise a normally open valve in series with a normally closed valve, which valves are connected to operate substantially simultaneously whereby the two valves are momentarily both open during said operation.

Preferably means are provided for operating the normally closed valve independently of the normally open valve for the purpose of placing the hydraulic system into communication with exhaust for a sufficient time to lower the load support.

Preferably also the normally open valve is disposed in the hydraulic system on that side of the normally closed valve nearer to exhaust.

The hydraulic pressure indicating device may be connected to a part of the hydraulic system between the two valves whereby the device only indicates the pressure in the system when said valves have been operated.

The valves may be electrically operated valves and operated by electric switches ganged together so that the valves are operated substantially simultaneously at the fully raised position of the load support.

The electric switches are preferably connected in circuit with a limit switch which is operated when the load support reaches the fully raised position, the circuit being such that operation of the first said switches can only actuate said valves when the limit switch has also been operated by the load support reaching its fully raised position.

In any of the above arrangements the hydraulic pressure sensing device may comprise an hydraulic pressure gauge mounted on the vehicle in a position in which it is clearly visible to an operator of the truck, which gauge is connected by a conduit to the hydraulic system.

The following is a more detailed description of various embodiments of the invention, reference being made to the accompanying drawings in which:

FIG. 2 is a diagram of the hydraulic system of the truck of FIG. 1;

FIG. 4 is a diagram showing the hydraulic system of the truck of FIG. 3; and

Figure 1:
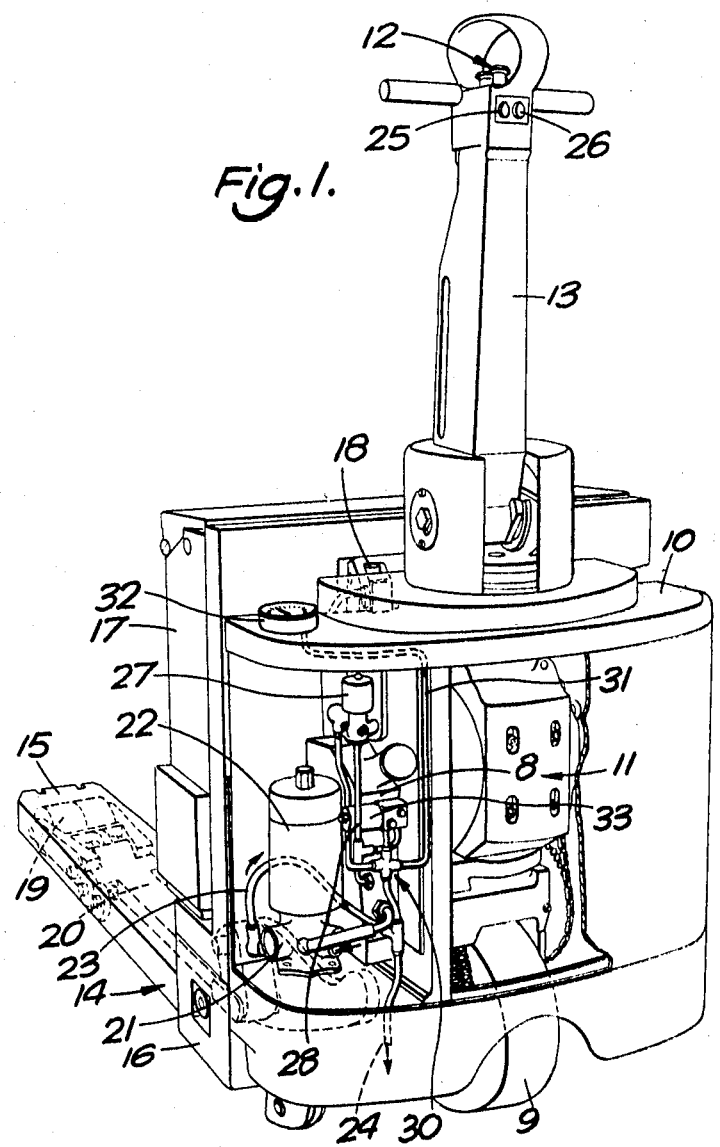
FIG. 1 is a perspective rear view of an industrial pallet truck.

With reference to FIG. 1: the industrial pallet truck comprises a body portion 10 supported on a single steerable drive wheel 9 and having a power unit 11 with direction and speed controls 12 mounted on the end of a control handle 13 pivotally mounted on the upper end of the power unit. A fork structure 14 projects forwardly from the body portion, the fork structure comprising two forks 15 (only one of which is shown) connected by a root portion 16 which supports the casing 17 housing the truck storage batteries. The root portion of the fork structure may be raised and lowered by jacks 18 (one only shown) and the outer ends of the forks are supported by trail wheels 19 connected to the root portion by linkages 20 so that as the root portion is raised the trail wheels are lowered to maintain the fork horizontal.

The hydraulic system for operating the jacks 18 comprises a pump 21 operated by an electric motor 22 to feed hydraulic fluid from a reservoir tank 8 through pipes 23 and 24 to the lifting jacks 18. Fluid is delivered from the pump 21 through a nonreturn valve 21a and a relief valve 21b is also associated with the pump.

The motor 22 is controlled by a pushbutton 25 on the truck control handle 13. On starting the motor, by depressing the button 25, the forks will rise until they reach their upper position at which a stop on the operating linkage engages a limit switch and stops the motor. In this kind of truck the full range of lift is normally about 6 inches. The forks may be lowered by depressing a second pushbutton 26 on the control handle which button opens a normally closed solenoid valve 27 to allow the hydraulic fluid to return from the jacks 18 to the reservoir tank through conduit 28. A relief valve 33 is connected between the reservoir tank 8 and the junction 30 in the conduit leading to the solenoid valve 27.

Also connected into the pressure side of the hydraulic system at the junction 30 there is a length of conduit 31 which feeds the fluid in the system to a pressure gauge 32 having a pointer whose movements are dependent on the pressure of the system. The gauge 32 is mounted on top of the body portion 10 in a position which is readily visible to the operator of the truck. The dial of the gauge is calibrated in units of weight. Therefore, since the pressure in the system varies in accordance with the load being carried on the forks, the gauge 32 will record the weight of the load being carried at any particular moment. It has, however, been found that it is important to read the gauge when the fork structure is in its fully raised position and the motor 22 has stopped. It is also desirable to relieve the inherent stresses in the lifting system when the fork structure is in its fully raised position in order to obtain a correct indication of the weight. To obtain a reading of the weight, therefore, the load is first raised fully and the solenoid valve 27 is then operated momentarily to relieve the inherent stresses in the hydraulic system. A true weight reading is then given by the gauge 32.

Figure 3:
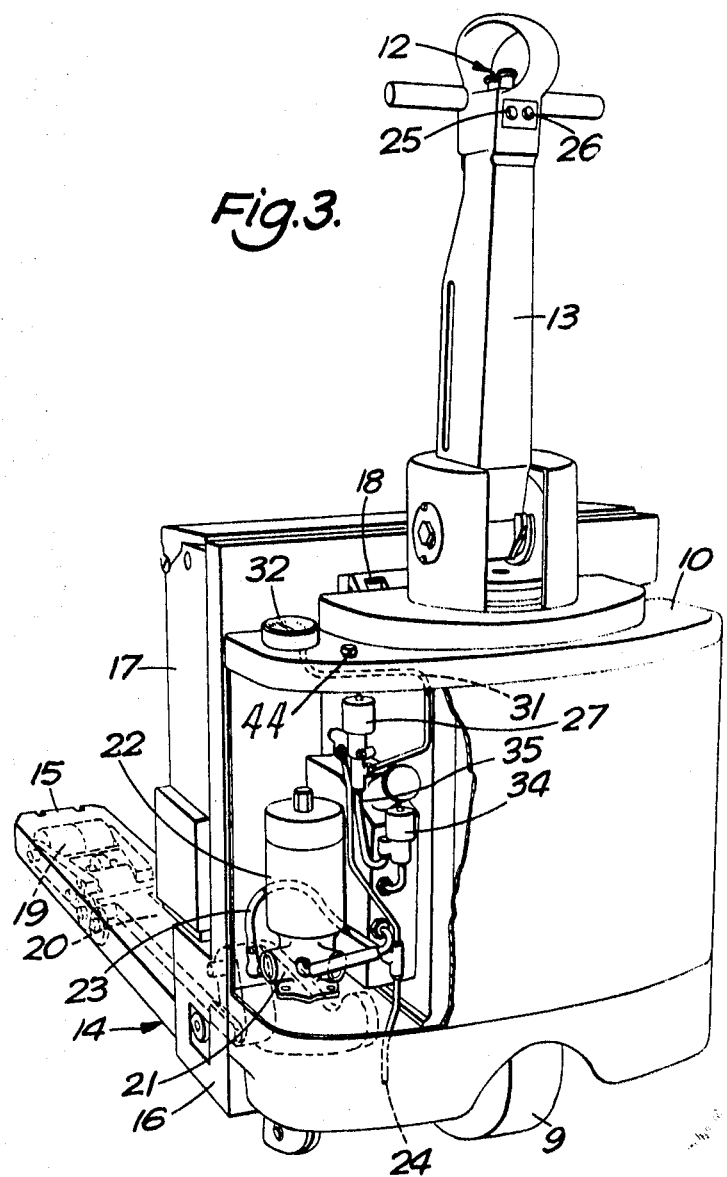
FIG. 3 is a similar view to FIG. 1 showing an alternative form of truck.
Figure 5:
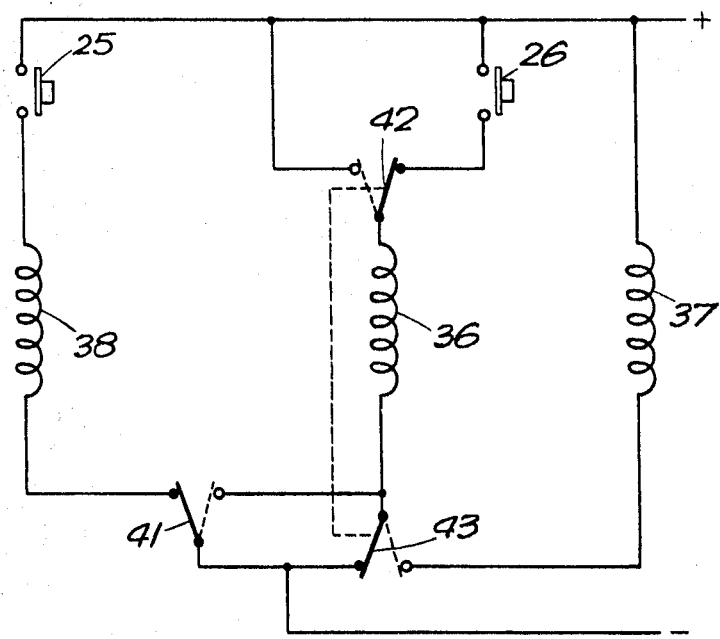
FIG. 5 shows the electrical control circuit for the hydraulic valves in the system of FIGS. 3 and 4.

It will be appreciated that with the arrangement just described, the length of time during which the solenoid valve 27 is momentarily opened will depend on the operator and to obtain consistent results it is desirable to provide a valve arrangement which when operated automatically places the hydraulic system into communication with reservoir tank 8 for a very brief but predetermined length of time. FIGS. 3, 4 and 5 show such an arrangement.

The pallet truck shown in FIG. 3 is similar to that shown in FIG. 1 except for the arrangement of the hydraulic system and like parts are given like reference numerals in the two FIGS. In the arrangement of FIGS. 3 and 4 a further solenoid valve 34, hereinafter referred to as the "weighing" valve, is disposed between the normally closed solenoid valve 27 and the reservoir tank 8. The valve 34 is normally open. In this arrangement the conduit 31 leading to the pressure gauge 32 is connected to the portion of conduit 35 between the valves 27 and 34.

FIG. 5 shows the electric circuit for controlling the valves 27 and 34. In the circuit of FIG. 5 the energizing coil of the solenoid valve 27 is indicated at 36 and the coil of the weighing valve 34 is indicated at 37. The energizing coil for actuating the motor 22 and pump 21 is indicated at 38.

The valve 27 is controlled by the aforementioned normally open pushbutton switch 26 and the motor is controlled by the aforementioned normally open pushbutton switch 25.

The changeover limit switch 41 is the limit switch referred to earlier which is operated when the load support is brought to its fully raised position. FIG. 5 shows in full line the position the switch 41 adopts when the load support is in its lowermost position. There is also provided a "weighing" switch assembly (operated by a pushbutton 44) which comprises two changeover switches 42 and 43 which are ganged together so as to operate simultaneously.

The full line positions of the switches 42 and 43 are the positions they adopt when the load support is in its lowermost position. In this position the valve 27 is closed and the valve 34 is open. When it is required to raise the load the switch 25 is closed and the coil 38 energized starting the motor 22 so that the pump 21 delivers hydraulic fluid under pressure to the jacks 18. The jacks are therefore extended raising the load until the limit switch 41 is changed over to the dotted line position shown in FIG. 5. This stops the motor and pump. When it is required to lower the load support again the switch 26 is closed and the coil 36 energized, opening the valve 27 so that hydraulic fluid from the jacks is vented to the reservoir tank 8.

When it is required to weigh the load on the truck the load is raised to its uppermost position and the ganged switches 42 and 43 are then operated so as to be moved to the dotted line position of FIG. 5. It will be seen that in this position the switch 26 becomes ineffective to lower the load. In the dotted line position both the coils 36 and 37 are energized substantially simultaneously (since the switch 41 is also in the dotted line position) and the valve 27 is opened and the valve 34 is closed. During the simultaneous operation of these two valves they are momentarily both open and the hydraulic system is momentarily placed in communication with the reservoir. The inherent stresses in the system are therefore relieved. When operation of the two valves is completed and the valve 27 is open and the valve 34 is closed it will be seen that the gauge 32, since it is connected to the conduit 35 between the two valves, will sense the hydraulic pressure in the system and will thus give a true reading of the weight of the load carried by the load support. When the weighing switch is returned to its original position the switches 42 and 43 return to the full line positions shown in FIG. 5, deenergizing the solenoids 36 and 37 so that the valve 27 closes and the valve 34 opens. The gauge 32 is therefore vented to the reservoir and will no longer give a reading. The coil 36 is brought into circuit with the switch 26 once again so that the load may be lowered if required by actuating the switch 26.

It will be appreciated that the invention is equally applicable to stillage trucks in which the forked structure 14 of the arrangements described above is replaced by a load platform structure.

One advantage of the invention is that the truck operator is able to check the weight of goods simultaneously to loading the goods into a van or onto a lorry. The two operations are thus combined into a single operation and the operator is readily able to ensure that he does not overload the van or lorry. The above arrangement also ensures that a correct reading of the weight is given and that a false reading is not given due to the inherent stresses in the hydraulic system.

I claim:

1. An industrial truck comprising: a body portion having a drive unit and being supported on a number of ground wheels; a load support projecting from the body portion of the truck; a hydraulic system for raising and lowering the load support through a short distance relatively to the body portion so as to pick up a load beneath which the support is introduced; a hydraulic pressure sensing device connected in the hydraulic system and calibrated in units of weight so as to give a direct reading of the weight of the load being carried by the load support, the hydraulic system being in communication with a reservoir through a normally open valve connected in series with a normally closed valve, which valves are connected to operate substantially simultaneously so that the normally open valve closes at the same time as the normally closed valve opens, whereby the two valves are momentarily both open during said operation, so that operation of the valves, just before a weight reading is taken, momentarily places the hydraulic system into communication with the reservoir.

2. A truck according to claim 1 wherein means are provided for operating the normally closed valve independently of the normally open valve for the purpose of placing the hydraulic system into communication with the reservoir for a sufficient time to lower the load support.

3. A truck according to claim 1 wherein the hydraulic pressure sensing device comprises an hydraulic pressure gauge mounted on the vehicle in a position in which it is clearly visible to an operator of the truck, which gauge is connected by a conduit to the hydraulic system.

4. A truck according to claim 1 wherein the normally open valve is disposed in the hydraulic system on that side of the normally closed valve which is nearer to the reservoir.

5. A truck according to claim 4 wherein the hydraulic pressure indicating device is connected to a part of the hydraulic system between the two valves whereby the device only indicates the pressure in the system when said valves have been operated.

6. A truck according to claim 1 wherein said valves are electrically operated valves and wherein the valves are operated by electric switches ganged together so that the valves are operated substantially simultaneously at the fully raised position of the load support.

7. A truck according to claim 6 wherein said electric switches are connected in circuit with a limit switch which is operated when the load support reaches the fully raised position, the circuit being such that operation of the first said switches can only actuate said valves when the limit switch has also been operated by the load support reaching its fully raised position.